United States Patent [19]

Hellstern-Burnell et al.

[11] Patent Number: 5,294,654
[45] Date of Patent: Mar. 15, 1994

[54] FLAME-RETARDED, CONDUCTIVE COMPOSITIONS WHICH INCLUDE POLYPHENYLENE ETHER AND POLYSTYRENE RESINS

[75] Inventors: Ann M. Hellstern-Burnell; Kim G. Balfour, both of Schenectady, N.Y.

[73] Assignee: General Electric Company, Pittsfield, Mass.

[21] Appl. No.: 2,524

[22] Filed: Jan. 11, 1993

Related U.S. Application Data

[63] Continuation of Ser. No. 743,849, Aug. 12, 1991, abandoned.

[51] Int. Cl.$^5$ ............ C08J 5/10; C08K 5/52; C08L 71/12
[52] U.S. Cl. ............ 524/127; 524/141; 524/449; 524/494; 524/496
[58] Field of Search ............ 524/127, 141, 494, 496, 524/449

[56] References Cited

U.S. PATENT DOCUMENTS

| | | | |
|---|---|---|---|
| 4,282,139 | 8/1981 | Sugio et al. | 260/42.17 |
| 4,283,326 | 8/1981 | Charles et al. | 260/40 R |
| 4,404,125 | 9/1983 | Abolins et al. | 252/511 |
| 4,423,189 | 12/1983 | Haaf | 524/505 |
| 4,467,057 | 8/1984 | Dieck et al. | 523/212 |
| 4,533,680 | 8/1985 | Kasuga et al. | 523/220 |
| 4,560,715 | 12/1985 | Ueeda et al. | 523/443 |
| 4,672,086 | 6/1987 | Seiler et al. | 524/539 |
| 4,677,160 | 6/1987 | Chaco et al. | 524/449 |
| 4,771,096 | 9/1988 | Bussink et al. | 524/508 |
| 4,816,510 | 3/1989 | Yates | 524/449 |
| 4,831,071 | 5/1989 | Ward et al. | 524/401 |
| 4,849,469 | 7/1989 | Crosby et al. | 524/439 |
| 4,874,810 | 10/1989 | Lee et al. | 524/505 |
| 4,892,904 | 1/1990 | Ting | 524/494 |
| 5,019,616 | 5/1991 | Avakian et al. | 524/141 |
| 5,084,496 | 1/1992 | Ishida et al. | 524/539 |

OTHER PUBLICATIONS

Delmonte, J. Technology of Carbon and Graphite Fiber Composites; Robert E. Krieger Pub.: Florida, 1981; Table of Contents and pp. 156–169.
Elias, Hans–Georg, Macromolecules 2: Synthesis, Materials, and Technology; Plenum Press: New York, 2nd edition, 1984, pp. 886–887, 943–944, 1094–1095, 1205–1206.
Orzechowski, S. "Predict and Control Thermoplastic Shrinkage"; RTP Company, Minn. 4(2), 1989.
Rosato, D. Encyclopedia of Polymer Science and Engineering; John, Wiley & Sons: New York, vol. 14, 1988, pp. 327–335, 340–344, 366–367.
Riggs, J. P. Encyclopedia of Polymer Science and Engineering; John, Wiley & Sons: New York, vol. 2, 1988, pp. 640–642, 668–669.
Brown, L.; Burns, D. Electronic Packaging and Production; Apr., 1990; pp. 50–53.

*Primary Examiner*—Paul R. Michl
*Assistant Examiner*—U. K. Rajguru

[57] ABSTRACT

Improved polyphenylene ether-based compositions are described, which also contain polystyrene; selected amounts of glass fibers and inorganic nonfibrous agents such as clay or mica; carbon fibers or metal-coated graphite fibers; and certain diphosphate- or polyphosphate-based flame retardant compositions. The compositions, which can be injection-molded, exhibit excellent electrical dissipation characteristics, as well as excellent flame retardancy (without cracking or "juicing"); heat distortion temperature characteristics; tensile yield; and flexural modulus. Specific methods for preparing such compositions also contribute to their enhanced performance. Furthermore, the compositions may be foamed

30 Claims, No Drawings

FLAME-RETARDED, CONDUCTIVE COMPOSITIONS WHICH INCLUDE POLYPHENYLENE ETHER AND POLYSTYRENE RESINS

This is a continuation of copending application Ser. No. 07/743,849 filed on Aug. 12, 1991 now abandoned.

This invention relates generally to thermoplastic resin compositions. More specifically, the subject matter contained herein is directed to polyphenylene ether-based compositions characterized by a wide variety of excellent properties; and to methods for making and using such compositions.

Polyphenylene ether-based resins, which are sometimes referred to as "PPE" or "polyphenylene oxide" resins, are a highly respected class of engineering thermoplastics, exhibiting many desirable properties, such as tensile strength and heat resistance.

Like other thermoplastics, PPE-based resins are not only injection moldable, but also lightweight, making them continually attractive replacement materials for the metals previously used in many end use products. However, many of these products contain electrical components, and one of the disadvantages of most plastics is that they are electrically insulative. This nonconductive nature of plastics can result in the accumulation of electrostatic charges on the surface of molded articles, such as paper copying machines.

In minimal amounts, these static charges cause undesirable effects, such as a sensation of shock when a person, who previously accumulated a charge by touching an article, then contacts a grounded object. The charges can also result in paper jam-ups in the above-mentioned copying machines. Furthermore, static charges can accumulate to levels equivalent to about 20,000–30,000 volts, and can cause more serious problems, such as sparking in flammable or explosive atmospheres, or the catastrophic failure of sensitive microelectronic devices.

Various methods are known in the art for making plastics such as PPE dissipate electrical charges. One such method involves incorporating conductive fillers in the plastic, in effect making the entire material electrically conductive. However, it is often critical that the filler be very uniformly dispersed in the plastic composition after the composition is processed, e.g., via injection molding. Lack of such uniformity may result in insufficient conductivity in the molded part, and this can in turn result in the part not dissipating static electricity immediately.

Furthermore, many other material requirements often exist for articles molded from plastics such as PPE. For example, the articles must exhibit very good flame retardancy; and the additive used to impart this characteristic must not cause other problems which have been associated with flame retardants in the past, such as cracking, or volatilization and condensation of the additive onto the article surface during molding (sometimes referred to as "plate-out" or "juicing").

The articles used for metal part replacement frequently must also exhibit a high degree of dimensional stability if they are to be used in areas requiring close tolerances. In addition, the articles often need to have high strength and stiffness.

It's clear that a need exists for a thermoplastic composition which can simultaneously exhibit all of the desirable properties mentioned above.

SUMMARY OF THE INVENTION

The needs discussed above have been satisfied by the discovery of an improved thermoplastic composition, comprising:
a) polyphenylene ether resin;
b) at least one polystyrene resin;
c) about 3% by weight to about 30% by weight glass fibers, based on the weight of the entire composition;
d) an effective amount of at least one inorganic, nonfibrous agent which dimensionally-stabilizes molded or extruded parts formed from the composition;
e) about 5% by weight to about 15% by weight, based on the weight of the entire composition, of a carbon-based material selected from the group consisting of carbon fibers and metal-coated graphite fibers; and
f) about 9% by weight to about 22% by weight, based on the weight of the entire composition, of a diphosphate- or polyphosphate-based flame retardant as described below.

The compositions described herein can be molded as a solid or a foam, and exhibit a combination of excellent electrical and physical properties, as will be described below.

Furthermore, the present invention includes within its scope improved compositions formed by a process which involves the pre-extrusion of certain components, followed by the extrusion of the pre-extrudate with the remaining components, so as to form thermoplastic pellets which exhibit a very uniform dispersion of all of the discrete components, thereby leading to the advantages mentioned above.

DETAILED DESCRIPTION OF THE INVENTION

The PPE resins which are suitable for component (a) of this invention are generally known in the art. Many of them are described in U.S. Pat. Nos. 3,306,874; 3,306,875; and 3,432,469 of Allan Hay; U.S. Pat. Nos. 3,257,357 and 3,257,358 of Gelu Stamatoff; U.S. Pat. No. 4,806,602 of Dwain M. White et al.; and U.S. Pat. No. 4,806,297 of Sterling B. Brown et al., all incorporated herein by reference. Both homopolymer and copolymer polyphenylene ethers are within the scope of this invention.

The preferred PPE resins are homo- and copolymers which comprise a plurality of structural units of the formula

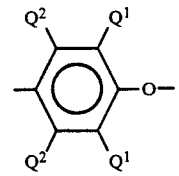

wherein each $Q^1$ is independently halogen, primary or secondary lower alkyl, phenyl, haloalkyl, aminoalkyl, hydrocarbonoxy, or halohydro-carbonoxy, wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined for $Q^1$.

Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Most often, each $Q^1$ is alkyl or phenyl, especially $C_{1-4}$ alkyl, and each $Q^2$ is hydrogen.

Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

This invention also includes within its scope PPE resins which contain certain moieties which modify properties such as molecular weight, melt viscosity, or impact strength. For example, vinyl monomers and vinylaromatic compounds may be grafted onto the PPE polymer, as described, for example, in the application of Sterling B. Brown et al., U.S. Ser. No. 351,903, filed May 15, 1989, (now U.S. Pat. No. 5,089,566) the entire contents of which are incorporated herein by reference.

As another example, coupled PPE polymers may also be used, in which the coupling agent is reacted with hydroxy groups of two PPE chains to produce a higher molecular weight polymer.

The PPE resins of this invention generally have a weight average molecular weight of about 20,000 to 80,000, as determined by gel permeation chromatography.

Furthermore, they can be prepared by methods known in the art: for example, oxidative coupling of an appropriate monohydroxyaromatic compound in the presence of a catalyst based on copper, manganese, or cobalt.

In preferred embodiments of this invention, the PPE resin constitutes from about 35% by weight to about 55% by weight of the entire composition. A more preferable range of PPE content for some end uses is from about 37% by weight to about 47% by weight.

Sometimes, various properties of the PPE resins, such as impact strength, can be improved by removing or inactivating some of the amino compounds found in the resin, as described in U.S. Pat. No. 4,902,753 (S. B. Brown et al), incorporated herein by reference. One technique for inactivation involves extrusion of the PPE with vacuum venting.

The polystyrene resins of the present invention are also generally known art, and are described, for example, in Chapter 3 of *Organic Polymer Chemistry*, Second Edition, K. J. Saunders; Chapman and Hall, 1988. These polymers are prepared by methods well-recognized in the art, including bulk, suspension, and emulsion polymerization. They often contain at least 25% by weight of structural units derived from a monomer of the formula

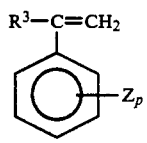

, where $R^3$ is hydrogen, lower alkyl, or halogen, Z is vinyl, halogen or lower alkyl; and p is from 0 to 5.

Examples of suitable polystyrene resins are provided in U.S. Pat. No. 4,816,510, issued to John B. Yates, III, and incorporated herein by reference. These include: homopolymers of styrene, chlorostyrene and vinyltoluene, random copolymers of styrene with one or more monomers illustrated by acrylonitirile, butadiene, alpha-methylstyrene, ethylvinylbenzene, divinylbenzene, and maleic anhydride; as well as rubber-modified polystyrenes (sometimes referred to high impact polystyrene, or HIPS) comprising blends and grafts wherein the rubber is a polybutadiene or a rubber copolymer of about 98%-70% styrene and about 2-30% diene monomer. In preferred embodiments of the present invention, the styrene polymer is homopolystyrene.

The polystyrene resin is usually present in the composition in an amount which ranges from about 15% by weight to about 30% by weight, based on the weight of the entire composition. In preferred embodiments, the amount of polystyrene present is in the range of about 17% to about 27%.

As mentioned above, the present invention contains glass fibers, which greatly increase flexural strength and modulus, as well as increasing tensile strength. In general, lime-aluminum borosilicate glass that is relatively soda-free ("E" glass) is preferred.

Although glass roving may be used, cut fibers are preferred. The length of such fibers is usually at least about 3 mm; and a preferred length is in the range of about 3 mm to about 13 mm. (These lengths are based on the material before incorporation into the composition). A preferred diameter for the fibers is in the range of about 0.002 mm to about 0.01 mm. General descriptions of glass fibers can be found in U.S. Pat. No. 4,226,761; incorporated herein by reference.

A preferred amount of glass fiber for the present invention is in the range of about 3% by weight to about 30% by weight, based on the weight of the entire composition. Larger amounts within this range are usually employed when the end use of the composition requires a higher degree of stiffness and strength. In some preferred embodiments, the amount of glass fiber present is in the range of about 6% by weight to about 25% by weight, while some very preferred embodiments employ glass fibers in an amount which ranges from about 10% by weight to about 20% by weight.

As mentioned above, the present invention requires an effective amount of at least one inorganic nonfibrous agent (component (d)) which dimensionally-stabilizes molded or extruded parts formed from these compositions. The use of component (d) is critical when processing conditions which are sometimes rigorous (such as injection molding), are employed, since its absence may adversely affect the uniform shrinkage and expansion characteristics of the composition. In other words, the composition itself may be subject to differential mold shrinkage, i.e, the tendency of the resin, during molding, to shrink more in the direction transverse to the direction of resin flow than in the direction of the flow itself. Furthermore, in the absence of component (d), parts formed from the resin may exhibit a greater tendency to warp after molding.

The preferred agents for component (d) are mica, clay, glass beads, glass flakes, and wollastonite. Effective amounts will of course differ according to the particular agent used, but they are generally in the range of about 3% by weight to about 12% by weight, based on the weight of the entire composition.

Mica is the preferred agent for component (d). Various forms of mica are suitable, and many are described in the literature and various U.S. patents, such as U.S. Pat. Nos. 4,283,326 and 4,560,715, both incorporated herein by reference. Examples of the various forms are muscovite, phlogopite, biotite, fluorophlogopite, and synthetic mica, with phlogopite being the most preferred. Furthermore, the mica is preferably in the form of flakes having an aspect ratio of about 50–100 (length/thickness).

Within the broader range described above for component (d), levels for mica are preferably in the range of about 5% by weight to about 10% by weight, based on the weight of the entire composition.

As mentioned above, clay may also be used as the dimension-stabilizing agent of component (d). As is well-known in the art, there are many types of clay (technically referred to as hydrated aluminum silicate) available, but the choice of a particular type for this invention is not particularly critical. However, the type of clay referred to as calcined kaolin is often preferred for this invention.

Preferred amounts of clay for the present invention are in the range of about 10% by weight to about 35% by weight, based on the weight of the entire composition. A most preferred range of clay is in the range of about 12% by weight to about 22% by weight, based on the weight of the entire composition.

Mixtures of materials for component (d) are also contemplated for the present invention, e.g., a mixture of mica and clay may be used. Appropriate levels of each particular agent in the mixture can be determined without undue experimentation, based on the general concept of dimensional stability described above.

The present invention includes, as component (e), about 5% by weight to about 15% by weight, based on the weight of the entire composition, of a carbon-based material selected from the group consisting of carbon fibers and metal-coated graphite fibers. These materials provide the conductivity required for the electrical dissipation characteristics of compositions of this invention. In most embodiments, carbon fibers are preferred, especially at levels in the range of about 7% by weight to about 10% by weight.

The carbon fibers usually have a length of at least about 3 mm, and are preferably in the range of about 3 mm to about 13 mm. (This range refers to the material before incorporation into the thermoplastic composition). Examples of commercially-available carbon fibers are those manufactured by the controlled pyrolysis of a precursor material, such as rayon, various pitches (petroleum or coal tar), and polyacrylonitrile. The preferred precursor is polyacrylonitrile.

Metal-coated carbon fibers (sometimes referred to as "metal-coated graphite fibers") which are suitable for the present invention are generally well-known. Examples of metals used to coat the fibers are nickel, silver, gold, brass, and copper, with nickel being preferred. The nickel coating thickness is usually about 0.4–0.6 microns. Methods for coating the fibers are also known in the art.

The addition of each particular type of carbon or graphite fiber for component (e) may provide conductivity to the overall composition according to a nonlinear relationship. However, one can easily determine the most appropriate level of the fiber by simply adding incremental amounts of the fiber to a composition and then measuring the resulting (conductivity).

The flame retardant for the present invention is a composition which comprises as its major component a diphosphate or polyphosphate compound having one of the following formulae:

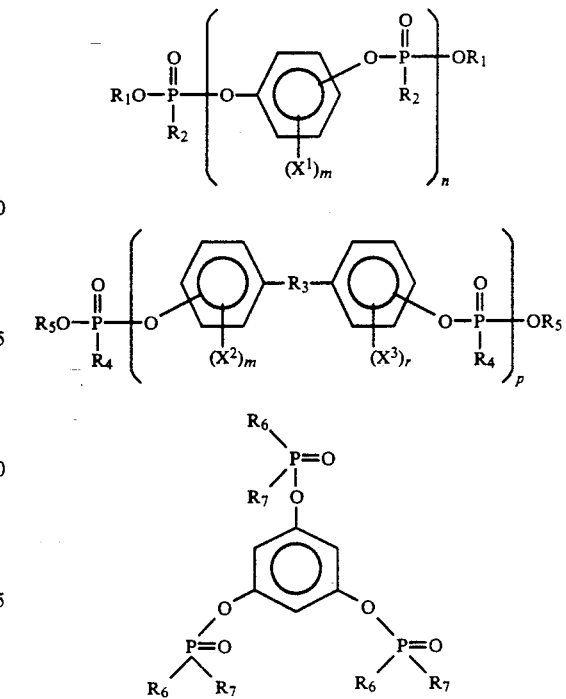

, or mixtures thereof, wherein $R_1$, $R_3$ and $R_5$ are, independently, hydrocarbon; $R_2$, $R_5$, $R_6$ and $R_7$ are, independently, hydrocarbon or hydrocarbonoxy; $X^1$, $X^2$ and $X^3$ are are either hydrogen, methyl, methoxy, or halogen, m and r are integers from 1 to 4; and n and p are integers from 1 to about 30.

In more preferred embodiments, $R_1$, $R_3$, and $R_5$ are, independently, phenyl or (lower) alkyl of from about 1 to 6 carbon atoms; and $R_2$, $R_5$, $R_6$ and $R_7$ are, independently, phenyl, (lower) alkyl of from about 1 to 6 carbon atoms, phenoxy, or (lower) alkoxy of from 1 to 6 carbon atoms. Moreover, in some preferred embodiments, the flame retardant composition of this invention is generally free of halogen compounds, upon final isolation of the composition.

The term "major component" as used to describe the flame retardant refers to the fact that the diphosphate or polyphosphate compound constitutes about 65% to 85% of the total weight of the flame retardant composition (which is generally a liquid). The remainder of the composition usually comprises various other phosphate oligomers and isomers which are usually by-products of the preparation of the flame retardant.

Methods used to prepare the flame retardant are generally known in the art; and described, for example, in UK Patent Application (GB) 2043083 A (W. Haaf; D. Heath, and F. Holub), the contents of which are generally incorporated herein by reference. As an example, the compounds can be prepared by reacting a halogenated phosphate compound with various dihydric or trihydric phenolic compounds until the desired number of phosphate functional units are obtained; followed by capping of the phosphate compound with a phenol. Examples of the phenolic compounds are dihydroxyaromatic compounds such as resorcinol (1,3-dihydroxybenzene); hydroquinone(1,4-dihydroxybenzene); 2,2-bis(4-hydroxyphenyl) propane ("bisphenol A"); and various trihydroxy aromatic compounds.

Specific reaction conditions for preparation of the flame retardant can be determined by those of ordinary skill in the art. In general, the ratio of the phenolic compound to the halogenated phosphate will determine the number of repeating phenol-phosphate units: the greater the stoichiometric excess of dihydroxy or trihydroxy aromatic compound to halogenated phosphate compound; the higher the number of repeating units.

Examples of specific flame retardant compounds falling within the scope of the above-described formulae are: bis-neopentyl piperidinyl diphosphate; tetraphenyl bisphenol-A diphosphate; tetraphenyl resorcinol diphosphate; hydroquinone diphosphate; bishpenol-A polyphosphate; and mixtures of any of these compounds.

As mentioned above, the flame retardant agent should be present in the composition at about 9% by weight to about 22% by weight, based on the weight of the entire composition. A preferred range is from about 9% by weight to about 17% by weight.

Various other additives may be present in effective amounts in the presently-described composition, such as drip retardants, dyes, pigments, colorants, lubricants, heat stabilizers, ultraviolet light stabilizers, and plasticizers. The levels of effectiveness can be determined without undue experimentation, but usually range, for each additive, from about 0.1% by weight to about 35% by weight, based on the weight of the entire composition.

It is thought that all of the components of the present invention can be extruded together. However as mentioned above, another aspect of the present invention is an improved, conductive thermoplastic composition, exhibiting very uniform electrical dissipation characteristics; and formed by a process which includes:

(i) preextruding the polyphenylene ether resin of component (a); the polystyrene resin of component (b); the polyphosphate or diphosphate compound of component (f); and, optionally, the dimension-stabilizing agent of component (d), into a thermoplastic pellet characterized by a uniform dispersion of components (d) and (f) within the polyphenylene ether matrix; and then (ii) extruding the product of step (i) with the glass fibers of component (c) and the carbon-based material of component (e);

so as to form, upon cooling and (pelletization), thermoplastic pellets characterized by a uniform dispersion of components (c), (d), (e), and (f) within the polyphenylene ether matrix.

Component (d) can be added in the extrusion step if it is not included in the preextrusion step. Furthermore, the various other additives mentioned above, such as lubricants, may be added in either step (i) or (ii), but are usually added in step (i).

The particular details of extrusion are not critical, as long as the steps outlined above are followed. In general, single or double screw extruders may be employed; and extruder temperatures range from about 100 degrees Centigrade to about 300 degrees Centigrade. The extruder may also be vacuum-vented.

As described in the examples which follow, the extruded compositions (which are sometimes referred to as "composites") exhibit a combination of highly desirable properties, not the least of which are very uniform electrical dissipation; and very good flame retardancy without cracking or plate-out.

The compositions of this invention may also be formed into foam articles which also possess the desirable physical and electrical characteristics described herein. Methods for preparing thermoplastic resin foams are generally known in the art, and described, for example, in U.S. Pat. Nos. 4,920,153; 4,598,104; 4,598,101; 4,598,100; 4,532,263; 4,262,052; 3,994,840 and 3,725,317; all of which can be incorporated by reference. Suitable methods are also described in *Plastics Foams*, Kurt C. Frisch and James H. Saunders editors, Part I and II; Marcel Dekker, Inc. NY 1972-1973. As an example, the pellets can be mixed with a blowing agent such as azodicarbonamide, sodium borohydride, hydrocerol, or sodium bicarbonate, and then extruded by conventional methods. Those of ordinary skill will be able to select particular foam-processing parameters based on the general teachings of the art.

Furthermore, the compositions of this invention can be molded into many types of articles by known injection molding techniques, as generally described, for example, in the Modern Plastics Encyclopedia 89, Mid-October Issue; McGraw-Hill, Inc., 1989; pp 264-272 et seq.

The following examples illustrate various embodiments of the present invention. However, they are not intended to limit the invention in any manner. All parts and percentages are given "by weight", unless otherwise specified.

EXAMPLES

Samples 2-10 were prepared by combining 52 parts-by-weight (pbw) polyphenylene ether (PPE) resin; 29.3 pbw homopolystyrene; 11.5 pbw of a flame retardant composition which contained as its major component tetraphenyl resorcinol diphosphate (RDP); and 7.4 pbw Suzorite mica, grade 200K; and preextruding the combined material on a twin screw extruder under vacuum (500-520 degrees F barrel temperature, at a screw rate of 150 rpm). (Sample 1 contained no Suzorite mica in the preextrusion step. For this sample, 56 pbw PPE, 31.5 pbw PS, and 12.5 pbw RDP were preextruded; and then 8 pbw carbon fibers, 5 pbw of the mica, and 10 pbw of the glass fibers were extruded with the prextrudate, as in samples 2-10).

The resulting material for each sample was pelletized into ⅛ inch pellets, which were then added to an extruder, along with the glass fibers (Owens Corning 497 DB chopped fibers); and Hercules 1805 chopped carbon fibers, each of the last-mentioned materials being added in an amount indicated in Tables 1 and 2. The extruder conditions were as follows: 550 degrees F barrel and die temperature; screw rate of 210 rpm. The resulting material was cooled and then pelletized into ⅛ inch pellets, which were then injection-molded into test specimens.

Sample A, a control, was processed under the same conditions as the preextrusion for samples 1-10, but it did not contain any glass, mica, or carbon fibers.

Various physical and electrical tests were performed on the test specimens. All of the results are outlined in the tables.

TABLE 1

| Properties | Sample A* | Sample 1 | Sample 2 |
|---|---|---|---|
| HDT (F @ 264 psi) | 221.0 | 246.0 | 246.0 |
| Tens Elong (%) | 14.1 | 4.1 | 4.2 |
| Tens Yield (psi) | 12480.0 | 17380.0 | 17590.0 |
| Flex Mod (× 1000) (psi) | 436.0 | 1368.0 | 1350.0 |
| Specific Gravity | — | 1.26 | 1.27 |
| UL-94 Rating | V-0 | V-0 | V-1 |

TABLE 1-continued

| Properties | Sample A* | Sample 1 | Sample 2 |
|---|---|---|---|
| (0.125") | | | |
| Flame out time (sec.) | 3.5 | 3.4 | 5.9 |
| Surface Resistivity (Ohm/sq) | | | |
| Voyager | — | $10^7$–$10^8$ | $10^9$ |
| Sp Systems SR-7800 | >$10^9$ | 2 × $10^5$ | 1 × $10^6$ |
| % Glass | | 10.2 | 11.1 |
| % Mica | | 4.6 | 5.8 |
| % CF | | 8.1 | 5.9 |

*Control

TABLE 2

| Example | 3 | 4 | 5 | 6 | 7 | 8 |
|---|---|---|---|---|---|---|
| Glass | 11.7 | 11.9 | 11.5 | 12.2 | 11.6 | 12.3 |
| Mica | 6.1 | 6.1 | 6.1 | 6.0 | 6.1 | 6.1 |
| Carbon Fiber | 8.24 | 7.07 | 7.27 | 8.43 | 8.22 | 8.19 |
| Surface Resistivity (ohm/sq) | | | | | | |
| Voyager Pinion Meter | $10^5$ | — | $10^6$ | $10^5$ | $10^5$–$10^6$ | $10^5$ |
| PS Systems Sr-7800 in accordance with EOS/ESD Guidelines | 2 × $10^3$ | — | 2 × $10^4$ | 2 × $10^3$ | 3 × $10^4$ | 2 × $10^3$ |
| Model 803 A Probe | — | 4.5 × $10^3$ | — | — | 1.4 × $10^5$ | 1.4 × 10 |
| ASTM-D257 | 7 × $10^5$ | 9 × $10^5$ | 1 × $10^6$ | 1 × $10^6$ | 2 × $10^6$ | 8 × $10^5$ |
| Volume Resistivity (ohm-cm) | | | | | | |
| ASTM-D257 | 3 × $10^5$ | 4 × $10^5$ | 1 × $10^6$ | 1 × $10^6$ | 2 × $10^6$ | 4 × $10^5$ |
| Model 803 A Probe | — | — | — | — | 1.4 × $10^5$ | 2 × $10^4$ |
| Resistance per ASTM D527 section 6 | 8 × $10^2$ | 7 × $10^3$ | — | 1 × $10^3$ | 7 × $10^4$ | 1 × 1 |
| Flex Mod. (psi) | | | | | | |
| * | 1.53M | — | 1.40M | 1.61M | 1.43M | 1.60M |
| ** | 1.77M | 1.56M | 1.68M | 1.74M | 1.59M | 1.74M |
| Flex Yield (psi) | | | | | | |
| * | 19290 | — | 18370 | 19170 | 19230 | 18510 |
| ** | 22862 | 23606 | 22926 | 22853 | 23110 | 22912 |
| * bar dimensions: 0.5" × 5" × 0.250" | | | | | | |
| ** bar dimensions: 0.5" × 6" × .125" | | | | | | |
| Tensile Yield (psi) | | | | | | |
| * | 13720 | — | 13760 | 14320 | 14030 | 13900 |
| ** | 15599 | 16987 | 15961 | 15520 | 16319 | 16139 |
| Tensile Modulus (psi) | | | | | | |
| ** | 2.18M | 1.90M | 1.77M | 2.10M | 1.86M | 2.12M |
| % Elong. | | | | | | |
| * | 3 | 3 | 3 | 3 | 3 | 3 |
| ** | 0.99 | 1.29 | 1.2 | 0.92 | 1.2 | 0.98 |
| * bar dimensions: 0.5" × 7.04" × 0.125" | | | | | | |
| ** bar dimensions: 0.5" × 8.04" × 0.125" | | | | | | |
| Izod Impact (ft-lb/in) | | | | | | |
| Un-notched | 4.4 | 4.3 | 4.4 | 4.5 | 4.4 | 3.8 |
| HDT (F @ 264 psi) | 249 | — | 249 | 250 | 249 | 248 |
| Specific Gravity | 1.29 | 1.28 | 1.28 | 1.29 | 1.28 | 1.29 |
| Shrinkage (in/in) | 0.0000 | 0.0001 | 0.0001 | 0.0001 | 0.0000 | 0.0000 |

The above data indicate that compositions of the present invention are electrically conductive, as opposed to control sample A, which was insulative (i.e., a surface resistivity which was greater than $10^9$ ohm/sq—above the scale's readability).

Furthermore, desirable increases in heat distortion temperature (HDT), tensile yield, and tensile modulus were readily apparent. The decrease in tensile elongation values was expected because of the addition of the mica, glass, and carbon fiber.

Flame retardancy for the compositions of this invention was also generally excellent, although sample 2 showed a very slight decrease in UL rating to "V-1" due to a long burn which increased the average flame-out time above the specified time of 5 seconds for a V-O rating.

More importantly, each of the samples of this invention exhibited little—if any—"juicing" during molding, while other control samples (not listed here) containing monophosphate flame retardants exhibited a high level of this undesirable phenomenon.

It should of course be understood that this invention may be modified in various aspects related to composition ingredients and processing details, such modifications falling within the scope of the claims which follow.

All of the above-mentioned patents are incorporated herein by reference.

What is claimed is:

1. An improved thermoplastic composition, comprising:
   a) polyphenylene ether resin;
   b) at least one polystyrene resin;
   c) about 3% by weight to about 30% by weight glass fibers, based on the weight of the entire composition;
   d) an effective amount of at least one inorganic, nonfibrous agent which dimensionally-stabilizes molded or extruded parts formed from the composition;
   e) about 5% by weight to about 15% by weight, based on the weight of the entire composition, of a carbon-based material selected from the group consisting of carbon fibers and metal-coated graphite fibers; and
   f) about 9% by weight to about 22% by weight, based on the weight of the entire composition, of a flame retardant composition which itself comprises as its major component a diphosphate or polyphosphate compound having one of the following formulae:

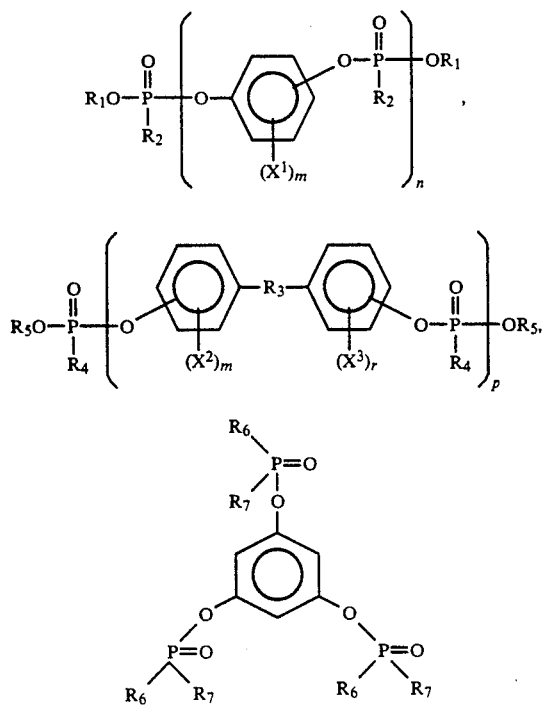

, or mixtures thereof, wherein $R_1$, $R_3$ and $R_5$ are, independently, hydrocarbon; $R_2$, $R_5$, $R_6$ and $R_7$ are, independently, hydrocarbon or hydrocarbonoxy; $X^1$, $X^2$ and $X^3$ are either hydrogen, methyl, methoxy, or halogen, m and r are integers from 1 to 4; and n and p are integers from 1 to about 30.

2. The composition of claim 1 wherein the polyphenylene ether comprises a plurality of structural units of the formula:

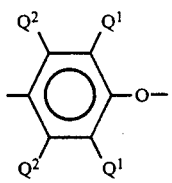

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. The composition of claim 2 wherein the polyphenylene ether is poly(2,6-dimethyl-1,4-phenylene ether).

4. The composition of claim 2 wherein the polyphenylene ether is derived from a monomer selected from the group consisting of 2,6-dimethyl phenol; 2,3,6-trimethyl phenol, and mixtures thereof.

5. The composition of claim 1 wherein the polyphenylene ether resin constitutes from about 35% by weight to about 55% by weight of the entire composition.

6. The composition of claim 5 wherein the polyphenylene ether resin constitutes from about 37% by weight to about 47% by weight of the entire composition.

7. The composition of claim 1 wherein the polystyrene resin is homopolystyrene.

8. The composition of claim 7 wherein the polystyrene resin constitutes from about 15% by weight to about 30% by weight of the entire composition.

9. The composition of claim 1 wherein the glass is in the form of glass fibers.

10. The composition of claim 9, comprising about 6% by weight to about 25% by weight glass fibers.

11. The composition of claim 9, wherein the fibers have a length of at least about 3 millimeters (mm).

12. The composition of claim 11, wherein the average length of the fibers is in the range of about 3 mm to about 13 mm.

13. The composition of claim 1, wherein the inorganic, nonfibrous agent of component (d) is selected from the group consisting of mica, clay, glass beads, glass flakes, and wollastonite.

14. The composition of claim 13, wherein the amount of component (d) present in the composition ranges from about 3% by weight to about 12% by weight, based on the weight of the entire composition.

15. The composition of claim 1, wherein component (e) comprises carbon fibers present in an amount which ranges from about 7% by weight to about 10% by weight.

16. The composition of claim 15, wherein the carbon fibers have an average length of at least about 3 mm.

17. The composition of claim 16, wherein the length of the carbon fibers is in the range of about 3 mm to about 13 mm.

18. The composition of claim 1, wherein component (e) comprises metal-coated carbon (graphite) fibers.

19. The composition of claim 18, wherein the metal is selected from the group consisting of nickel, silver, gold, brass, and copper.

20. The composition of claim 1, wherein the diphosphate flame retardant of component (f) is present in an amount which ranges from about 9% by weight to about 17% by weight.

21. The composition of claim 1, wherein the diphosphate flame retardant compound is selected from the group consisting of tetraphenyl resorcinol diphosphate; hydroquinone diphosphate; bisneopentyl piperidinyl diphosphate; tetraphenyl bisphenol-A diphosphate; bisphenol-A polyphosphate; and mixtures of any of these compounds.

22. The composition of claim 1, further comprising an effective amount of at least one additive selected from the group consisting of drip retardants, dyes, pigments, colorants, lubricants, heat stabilizers, ultraviolet light stabilizers, and plasticizers.

23. A foamed article, comprising the composition of claim 1.

24. A conductive thermoplastic composition exhibiting electrical dissipation characteristics; and comprising
   a) polyphenylene ether resin;
   b) at least one polystyrene resin;
   c) about 3% by weight to about 30% by weight glass fibers, based on the weight of the entire composition;
   d) an effective amount of at least one inorganic, nonfibrous agent which dimensionally-stabilizes molded or extruded parts formed from the composition;
   e) about 5% by weight to about 15% by weight, based on the weight of the entire composition, of a carbon-based material selected from the group consisting of carbon fibers and metal-coated graphite fibers; and f) about 9% by weight to about 22% by weight, based on the weight of the entire composition, of a flame retardant composition which itself comprises as its major component a diphosphate or polyphosphate compound having one of the following formulae:

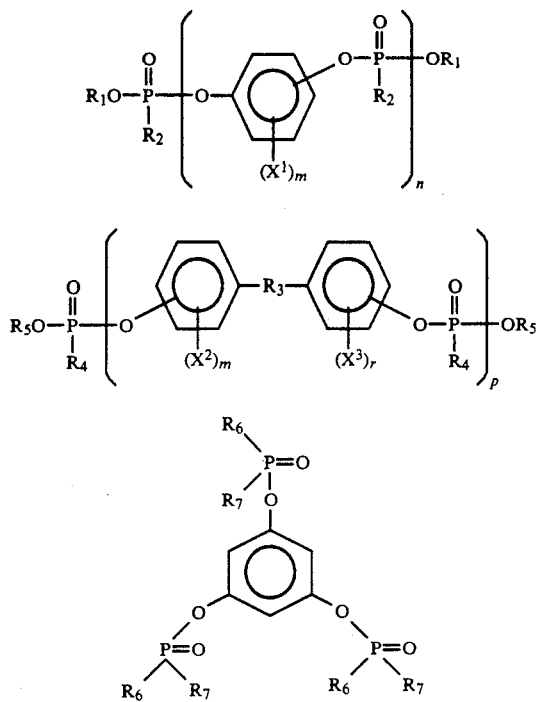

, or mixtures thereof, wherein $R^1$, $R^3$ and $R^5$ are, independently, hydrocarbon; $R^2$, $R^5$, $R^6$ and $R^7$ are, independently, hydrocarbon or hydrocarbonoxy; $X^1$, $X^2$ and $X^3$ are are either hydrogen, methyl, methoxy, or halogen; m and r are integers from 1 to 4; and n and p are integers from 1 to about 30; said composition being prepared by:

(i) preextruding the polyphenylene ether resin; the polystyrene resin; the diphosphate compound of component (f); and optionally, the dimensionally-stabilizing agent of component (d), into a thermoplastic pellet characterized by a uniform dispersion of components (d) and (f) within the polyphenylene ether matrix; and then (ii) extruding the product of step (i) with the glass of component (c) and the carbon-based material of component (e);

so as to form, upon cooling and (pelletization), thermoplastic pellets characterized by a uniform dispersion of components (c), (d), (e), and (f) within the polyphenylene ether matrix.

25. The composition of claim 24, wherein the dimensionally-stabilizing agent of component (d) is added during extrusion step (ii).

26. The composition of claim 24, foamed into a thermoplastic article.

27. An injection-molded article formed from the composition of claim 1.

28. The composition of claim 1, wherein, for component (f), $R_1$, $R_3$, and $R_5$ are, independently, phenyl or (lower) alkyl of from about 1 to 6 carbon atoms; and $R_2$, $R_5$, $R_6$ and $R_7$ are, independently, phenyl, (lower) alkyl of from about 1 to 6 carbon atoms, phenoxy, or (lower) alkoxy of from 1 to 6 carbon atoms.

29. The composition of claim 1, wherein the flame retardant agent of component (f) is substantially free of halogen compounds.

30. A thermoplastic composition, consisting essentially of a) polyphenylene ether resin present at a level of from 35% by weight to 55% by weight of the entire composition;

b) at least one polystyrene resin present at a level of from 15% to 30% by weight based on the weight of the entire composition;

c) glass fibers present at 3% by weight, 30% by weight based on the weight of the entire composition;

d) mica present at a level of 3 to 12% by weight based on the weight of the entire composition;

e) a carbon-based material selected from the group consisting of carbon fibers and metal-coated graphite fibers, said carbon-based material being present at a level of from 5% by weight to 15% by weight based on the weight of the entire composition; and f) tetraphenyl resorcinol diphosphate present at a level of from 9 to 22% by weight, based on the weight of the entire composition.

* * * * *